US007255486B2

(12) United States Patent
Cox et al.

(10) Patent No.: US 7,255,486 B2
(45) Date of Patent: Aug. 14, 2007

(54) FIELD TERMINATION APPARATUS AND METHOD FOR SMALL FORM FACTOR OPTICAL CONNECTORS WITH THERMOPLASTIC ADHESIVE

(75) Inventors: Larry R. Cox, Austin, TX (US); Edward B. Lurie, Round Rock, TX (US); Eric M. Morgan, Moncure, NC (US); David S. Hardcastle, Liberty Hill, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 225 days.

(21) Appl. No.: 10/988,965

(22) Filed: Nov. 15, 2004

(65) Prior Publication Data

US 2006/0104574 A1 May 18, 2006

(51) Int. Cl.
*G02B 6/38* (2006.01)
(52) U.S. Cl. .............................. 385/60; 385/53; 385/56; 385/92; 385/60
(58) Field of Classification Search .................... 385/60
See application file for complete search history.

(56) References Cited

U.S. PATENT DOCUMENTS

| 4,984,865 A | | 1/1991 | Lee et al. | |
| 5,166,996 A | * | 11/1992 | McCoy | 385/84 |
| 5,446,819 A | * | 8/1995 | Foster et al. | 385/80 |
| 5,481,634 A | | 1/1996 | Anderson et al. | |
| 5,719,977 A | | 2/1998 | Lampert et al. | |

(Continued)

FOREIGN PATENT DOCUMENTS

JP          04271309 A  *  9/1992

OTHER PUBLICATIONS

U.S. Application entitled "Small Form Factor Optical Connector With Thermoplastic Adhesive", filed Mar. 26, 2004, having U.S. Appl. No. 10/811,437.

(Continued)

*Primary Examiner*—Frank G. Font
*Assistant Examiner*—Eric Wong
(74) *Attorney, Agent, or Firm*—Gregg H. Rosenblatt

(57) ABSTRACT

A load adapter and method for terminating an optical fiber in a small form factor connector having a ferrule portion and a barrel portion that include a pre-loaded thermoplastic adhesive material, and a housing. The load adapter includes a thermally conductive body having a base section and a connector mounting section extending axially therefrom. The base section is adapted to be inserted/placed in an oven port of a portable heat source. The connector mounting section has a substantially cylindrical shape adapted to surround a substantial portion of the small form factor connector housing and includes at least one slot. The connector mounting section includes a mount adapted to receive the small form factor connector. The mount includes a stem having a substantially cylindrical structure adapted to slidably receive the ferrule portion of the small form factor connector, where an end of a received ferrule portion of the small form factor connector extends beyond an edge of an inner wall of the stem. An optical fiber is inserted through the connector housing and ferrule portion such that an end of the optical fiber extends beyond the end of the ferrule portion. The load adapter can then be removed from the heat source, cooled, and the end of the optical fiber can be polished. The load adapter and method can thus provide for practical field termination of an optical fiber in a small form factor fiber connector.

7 Claims, 4 Drawing Sheets

U.S. PATENT DOCUMENTS 6,318,903 B1 11/2001 Andrews et al.
2005/0213891 A1* 9/2005 Hardcastle et al. ........... 385/60

OTHER PUBLICATIONS

U.S. Application entitled "Fiber Polishing Apparatus and Method for Field Terminable Optical Connectors", filed Nov. 15, 2004, having U.S. Appl. No. 10/988,816.

U.S. Application entitles "Device for Holding Field Termination Load Adapter for Optical Connectors", filed Nov. 15, 2004, having U.S. Appl. No. 10/988,968.

Product Manual, "SC, FC and ST* Hot Melt Fiber Optic Connectors—Instructions"; (1998); 3M Company, Austin, TX.

* cited by examiner

FIELD TERMINATION APPARATUS AND METHOD FOR SMALL FORM FACTOR OPTICAL CONNECTORS WITH THERMOPLASTIC ADHESIVE

BACKGROUND OF THE INVENTION

1. Field of the Invention

The present invention is directed to an optical connector. More specifically, the present invention is directed to an apparatus and method for the field termination of small form factor optical connectors having a thermoplastic adhesive.

2. Related Art

Mechanical optical fiber connectors for the telecommunications industry are known. In recent years, an emphasis has been placed on the use of small form factor (SFF) optical fiber connectors. For example, LC ("Lucent Connectors") optical-type connectors have been described in U.S. Pat. Nos. 5,481,634; 5,719,977; and 6,318,903. These connectors are used for joining optical fiber segments at their ends and for connecting optical fiber cables to active and passive devices. The LC form factor is about 50% smaller than the form factors for other conventional optical connectors, such as ST, FC, and SC, which can be referred to as large form factor (LFF) connectors.

However, commercially available LC connectors are not well suited for field installations. Conventional adhesive materials include thermal, anaerobic or UV curing adhesives as well as the use of two-part epoxies and acrylates. For example, LC connectors typically use epoxy-based resins (e.g., two part epoxies) for fiber retention within the ferrule portion of the connector. These epoxies require about 10 to 15 minutes to heat cure after application. Once set, the fiber cannot be removed from the ferrule without breaking the fiber, thus making resetting of the optical fiber in the ferrule impractical.

SUMMARY OF THE INVENTION

According to a first aspect of the present invention, a load adapter is provided for terminating an optical fiber in a small form factor connector having a ferrule portion and a barrel portion that include a pre-loaded thermoplastic adhesive material, and a housing. The load adapter includes a thermally conductive body having a base section and a connector mounting section extending axially therefrom. The base section is adapted to be inserted in an oven port of a portable heat source. The connector mounting section has a substantially cylindrical shape adapted to surround a substantial portion of the small form factor connector housing and includes at least one slot. The connector mounting section includes a mount adapted to receive the small form factor connector. The mount includes a stem having a substantially cylindrical structure adapted to slidably receive the ferrule portion of the small form factor connector, where an end of a received ferrule portion of the small form factor connector extends beyond an edge of an inner wall of the stem.

According to another embodiment, a load adapter for terminating an optical fiber in a small form factor connector can include a thermally conductive body having a base section and a connector mounting section extending axially therefrom. The load adapter can further include a thermally conductive cap having a substantially cylindrical body adapted to be slidably received in an opening of the connector mounting section, where the cap includes a cap slot to slidably receive the connector body portion of the small form factor connector.

According to another embodiment, a method is provided for terminating an optical fiber in an LC-type optical connector having a housing and having a ferrule portion and a barrel portion that include a pre-loaded thermoplastic adhesive material. The method includes providing a load adapter comprising a thermally conductive body having a base section and a connector mounting section extending axially therefrom. The LC-type connector is mounted in the connector mounting section of the load adapter. This mounting step includes slidably disposing the ferrule portion of the LC-type connector in a stem portion of the connector mounting section, where an end of the ferrule portion of the small form factor connector extends beyond an edge of an inner wall of the stem. The base section is inserted in an oven port of a portable heat source. Heat from the oven is applied to the load adapter to bring the thermoplastic material to a softening point. An optical fiber is inserted through the connector housing and ferrule portion such that an end of the optical fiber extends beyond the end of the ferrule portion. The load adapter can then be removed from the heat source and cooled. Then, the end of the optical fiber can be scored and polished.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1C:
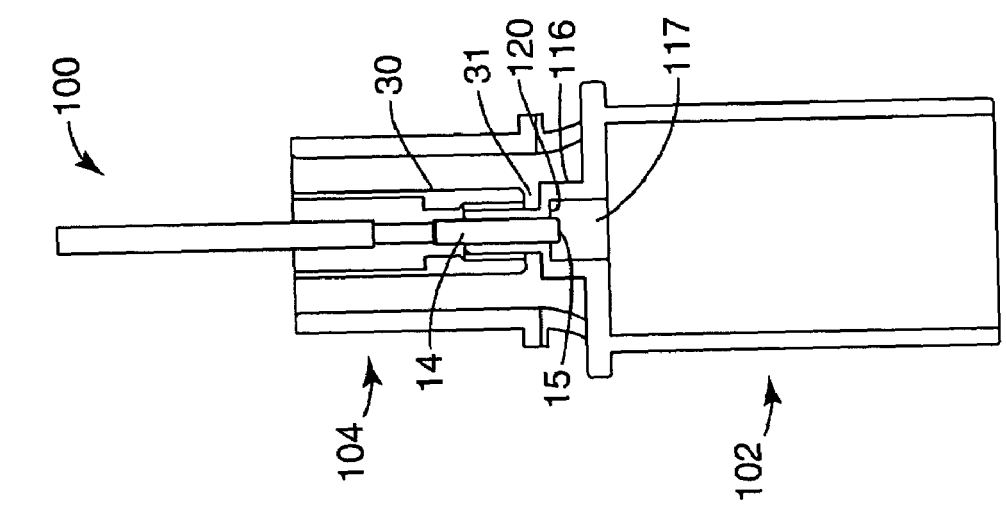
FIGS. 1A–1C show schematic views of a load adapter according to an exemplary embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The present invention is directed to an apparatus and method for field termination of a small-form factor optical connector adapted to use thermoplastic adhesives.

According to an exemplary embodiment of the present invention, a "load adapter" device is designed to receive a small form factor (SFF), e.g., LC-type, MU-type, or LX5-type, optical fiber connector that includes a preloaded thermoplastic adhesive. The load adapter can then be placed in a field oven or heating device to heat the preloaded thermoplastic adhesive to an appropriate temperature to receive an optical fiber. The load adapter and method of exemplary embodiments can thus provide for practical field termination of an optical fiber in, e.g., a LC-type, optical fiber connector.

Figure 1B:
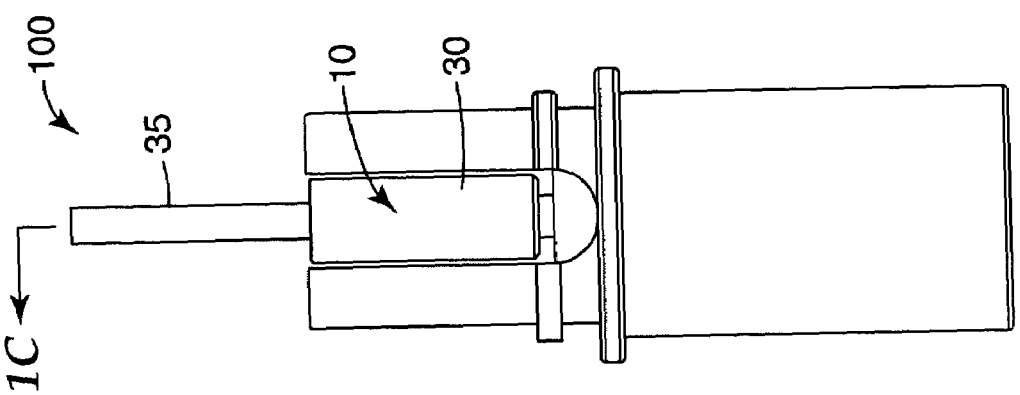
Figure 1A:
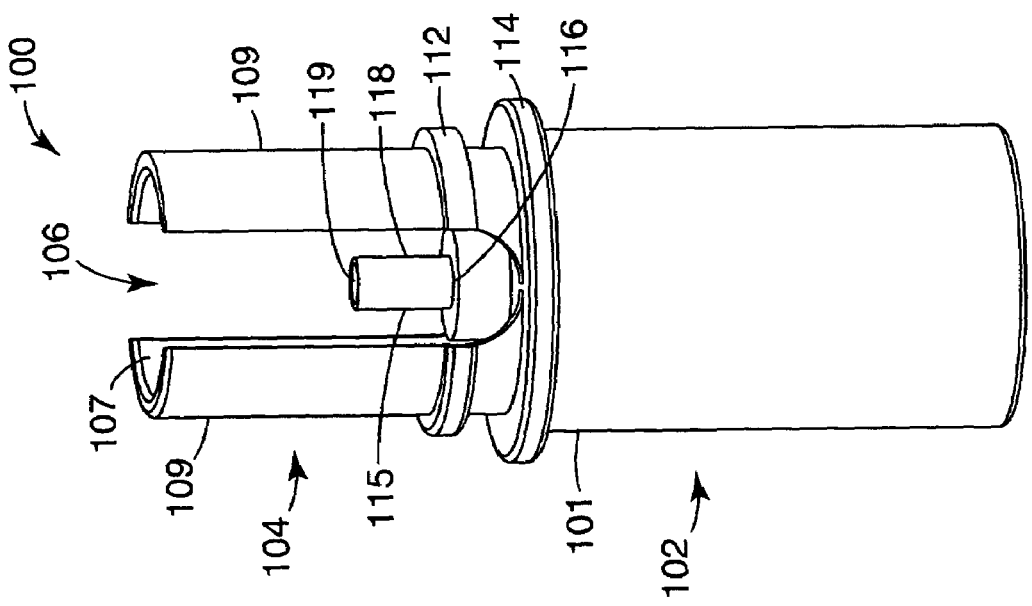

A load adapter according to an exemplary embodiment is shown in FIGS. 1A–1C. As the investigators have determined, a load adapter device having a suitable structure can be utilized to provide practical field termination capability (e.g., the termination of an optical fiber in about 1–2 minutes) for LC-type connectors, with a reduced risk of damaging the optical connector housing.

Load adapter 100 shown in FIG. 1A (isometric view) includes a main body 101 that can include two or more sections, a base section 102 and a connector mounting section 104. Body 101 is constructed (e.g., by a machining process) from a material having suitable thermal conductivity, such as a metal (e.g., brass, aluminum, etc.), that permits the rapid transmission of heat from an oven or other heating source to the ferrule portion of a SFF connector mounted in the load adapter. This heat then melts/softens the thermoplastic adhesive preloaded in the ferrule/barrel portion of the SFF connector, permitting insertion of an optical fiber in the SFF connector. In a further exemplary embodiment, the body 101 can be nickel plated to provide long term durability.

Figure 2:
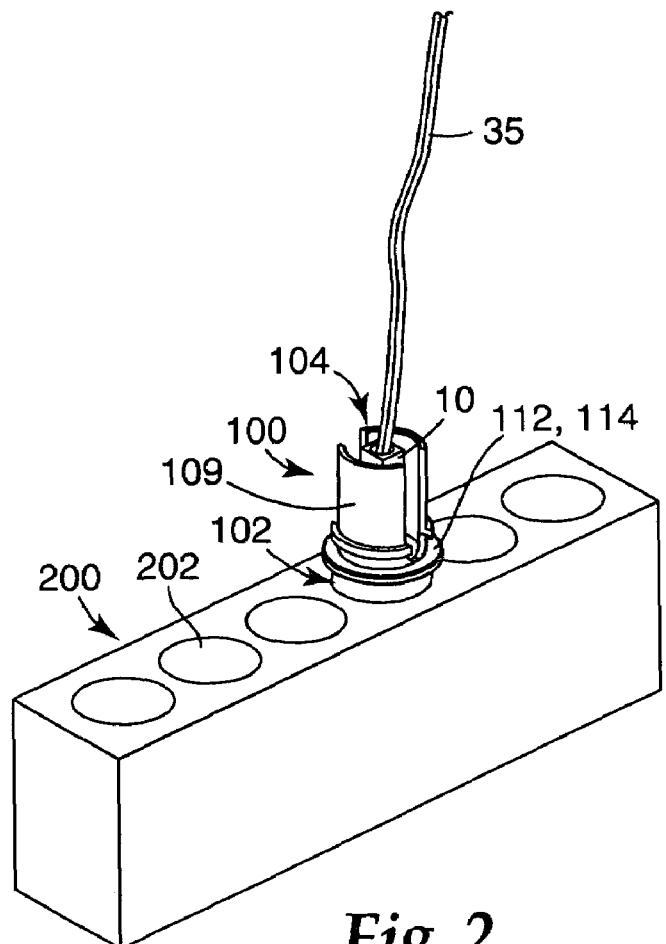
FIG. 2 shows a schematic view of a load adapter mounted in a portable oven.
Figure 3:
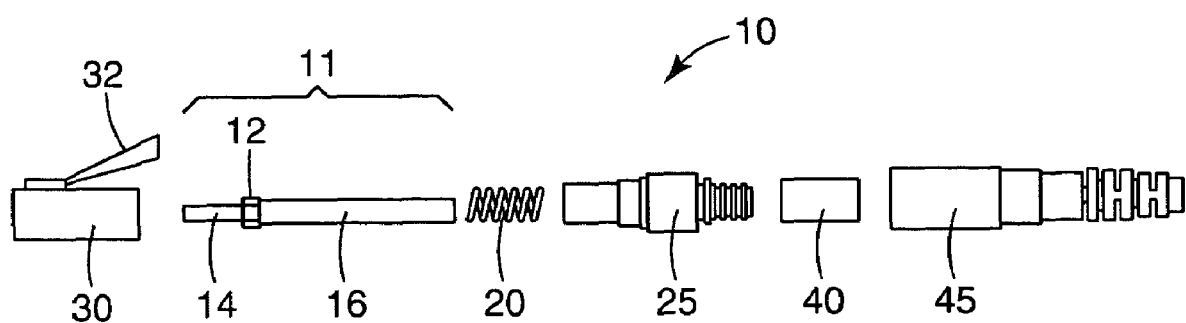
FIG. 3 shows an exploded view of an exemplary small form factor connector.

Base section 102 is configured to be received in a suitable field oven or other heat source (see e.g., field oven 150, FIG. 2) for the rapid transfer of heat from the oven to a SFF connector (e.g., LC-type connector 10, FIG. 3). In an exemplary embodiment, base 102 is configured as a substantially open cylinder, separated from connector mounting section 104 by one or more retaining protrusions or rings 112, 114. In an alternative embodiment, base 102 can be configured as a substantially solid cylinder.

The SFF connector 10, which is preloaded with a thermoplastic adhesive material, is received by connector mounting section 104. In this exemplary configuration, connector mounting section 104 is configured as a substantially cylindrical body having an opening 107, which is configured to receive the SFF connector, such as SFF connector 10, having connector body 30 and optical fiber jacket 35, shown in FIG. 1B. In addition, one or more slots or longitudinal openings 106 can be provided in the connector mounting section 104. Slots 106 can be utilized to provide an opening for a SFF connector latch mechanism, such as latch 32 (shown in FIG. 3), so that a SFF connector can be received without the SFF connector housing body having to directly contact load adapter body 101.

In addition, connector mounting section 104 can be utilized to regulate the amount of heat that the housing of a SFF connector is exposed to. For example, the slots 106 can provide suitable thermal management by reducing the amount of thermally conductive surface area of connector mounting section 104. In addition, the inner diameter of the wall(s) 109 of the connector mounting section 104 is designed to provide suitable heat transfer to the connector housing 30 by surrounding a substantial portion of the connector body without contacting the housing 30 (e.g., by providing a suitable air gap between the connector housing 30 and wall(s) 109). The wall(s) of connector mounting section 104 can also be thinned to provide low thermal inertia so that the temperature of the connector housing 30 can be brought to a sufficient elevated temperature, without heating the housing 30 to a temperature that would cause significant thermal distortion or damage. For example, the walls of connector mounting section 104 can have a thickness of about 0.03 in. (0.76 mm) to about 0.075 in. (1.9 mm). This load adapter design permits the rapid heat transfer from the oven or heat source to the connector, while reducing the likelihood of an "over heating" of the connector, which could result in connector distortion, particularly in the event that the load adapter and connector be left in the oven or heat source for an extended period of time (e.g., greater than 10 minutes).

Connector mounting section 104 further includes a mount 115 that receives the SFF connector. In this exemplary embodiment, the mount 115 includes two main parts, a stem 118 and a stem boss 116. As shown in FIGS. 1A and 1C, stem 118 can be configured as a substantially cylindrical structure that extends from stem boss 116, which can act as a base for the stem. In an exemplary embodiment, for an LC-type connector, stem 118 extends from stem boss 116 at a distance of about 0.1 in. (2.54 mm) to about 0.2 in. (5.08 mm), preferably about 0.16 in. The inner diameter of stem 118 can be configured to slidably receive the ferrule portion 14 of the SFF connector, while the outer diameter of stem 118 can be configured to allow passage of the connector outer housing 30 over the stem 118. An end portion 119 of stem 118 preferably contacts a portion of the SFF connector collar 12 to enhance direct heat transfer to the barrel/ferrule portions of the connector 10. In this configuration, the stem boss 116 can also be formed as a cylinder and can provide a pedestal for stem 118.

As is further shown in FIG. 1C, a cross-section view of load adapter 100, in an exemplary embodiment, the height of stem 118 is configured to allow ferrule 14 of the SFF connector 10 (see FIG. 3), when mounted onto stem 118, to extend below an inner edge 120 of the stem 118 into cavity 117. Cavity 117 can be formed as a counter bore in the interior portion of stem boss 116. In this configuration, the end 15 of ferrule 14 extends beyond the edge 120 of the inner wall of the stem 118. Thus, when heated, the amount of adhesive that protrudes beyond the end 15 of ferrule 14 that may adhere to the inner surface of stem 118 (also referred to as "wicking") can be significantly reduced. In addition, the height of stem 118 and/or the height of stem boss 116 can be configured so that, when connector 10 is fully seated, the end face 31 of the SFF connector housing does not come in direct contact with the stem boss 116 (e.g., an air gap is formed therebetween), to reduce the possibility of distortion of the SFF connector housing.

As mentioned above, the load adapter 100 can further include one or more protrusions or rings 112, 114. These rings 112, 114 can be utilized to allow the holding of load adapter 100 by a tool (not shown) for placement into and/or removal from an oven or heat source.

In order to provide for practical field termination capability, the SFF connector mounted in the load adapter 100 is preloaded with a thermoplastic adhesive that can rapidly soften at a sufficient elevated temperature and that can rapidly harden when exposed to ambient (e.g., room) temperature. For example, the thermoplastic adhesive utilized can be a thermoplastic resin, such as described in U.S. Pat. No. 4,984,865, incorporated by reference herein in its entirety. In addition, the thermoplastic adhesive can be an ultra high temperature (UHT) thermoplastic adhesive material which provides a high softening point and that is capable of satisfying environmentally stringent Telcordia GR-326 specifications. In one aspect, reduced assembly times in field termination applications can be accomplished. Other suitable adhesives and the pre-loading of an exemplary LC-type optical connector are further described in commonly-owned and co-pending U.S. patent application Ser. No. 10/811,437, incorporated by reference herein in its entirety.

As mentioned above, load adapter 100 is configured to be placed in an oven or suitable heating source, such as oven 200, shown schematically in FIG. 2. Oven 200 includes one or more oven ports 202, which allows for the termination of single/multiple SFF connectors in the field. Oven 200 is preferably portable and can provide adjustable oven port temperatures of at least about 200° C., preferably from about 260° C.–265° C. Exemplary portable ovens are supplied by Kitco, located in Virginia.

As shown in FIG. 2, load adapter 100 is received by oven port 202. In an exemplary embodiment the height of base section 102 is such that the protrusion(s) or ring(s) 112 do not come in direct contact with the surface of oven port 202 when the load adapter is finally positioned in the oven port 202. Heat from the oven 200 can fill the cavity of base section 102 and can be distributed to the stem portion 115 of the load adapter. In addition, heat from oven 200 is conducted by the load adapter body, to the wall(s) 109 of the connector mounting section 104 to elevate the temperature of the connector housing 30. After approximately 1–2 minutes, preferably about 1.5 minutes, the preloaded thermoplastic adhesive softens or melts, allowing insertion of a stripped portion of an optical fiber (not shown). After removal of the load adapter, using e.g., a special tool, such as that described in a commonly owned, copending U.S. patent application entitled "Device for Holding Field Termination Load Adapter For Optical Connectors", incorporated by reference herein in its entirety, the adhesive cools and hardens, adhering the optical fiber to the ferrule portion of the SFF connector. The fiber jacket and strength members of the fiber cable can then be crimped or held onto the rear portion of the SFF connector.

For example, FIG. 3 shows an exemplary SFF connector, here an LC-type optical fiber connector 10 in an exploded view. Connector 10 includes a housing 30 having a latching arm 32 and an axial or central bore to receive ferrule assembly 11. Housing 30 and latching arm 32 are formed or molded to be received into an LC receptacle.

According to an exemplary embodiment, LC housing 30 is formed or molded from a high temperature material, such as a high temperature polymer (e.g., plastic) material. The high temperature polymer material is capable of withstanding temperatures of at least 190° C. In exemplary embodiments, the high temperature polymer material is capable of withstanding temperatures of at least 210° C., preferably in the range of about 230° C. to about 240° C., without deformation of the body dimensions. Deformation can result in the interference with the mateability of the connector to another connector or piece of equipment. The construction of an exemplary LC-type optical connector is further described in commonly-owned and co-pending U.S. patent application Ser. No. 10/811,437, incorporated by reference above.

Connector 10 further includes a ferrule assembly 11. The ferrule assembly can be designed to include a ferrule 14, a collar 12 and a barrel 16. Collar 12 can be used as a flange to provide resistance against spring 20, to maintain the position of the ferrule assembly within housing 30. Ferrule 14 can be formed from a ceramic, glass, plastic, or metal material to support an optical fiber inserted therein. Barrel 16 can be short or elongated, and can be formed from (e.g., by machining) a thermally conductive material, such as a metal or high temperature polymer, or can be a press fit assembly to the ferrule collar or a threaded assembly, or can comprise an injection-molded, integral material.

An optical fiber (not shown) can be inserted through the barrel 16, such that the fiber end slightly protrudes from or is coincident or coplanar with the end face of ferrule 14. The thermoplastic material, also referred to as a "hot melt" adhesive or ultra high temperature (UHT) hot melt adhesive, pre-loaded into the ferrule assembly, can be heated in the field as described above.

Connector 10 can further include an insert or connector body 25 that provides for the retention of the ferrule assembly 11 and spring 20 within housing 30. Connector body 25 can slide over the ferrule assembly and can be secured in place by the outer connector housing 30. A crimp ring 40 provides additional axial retention and strain relief for the strength members of the optical cable or optical fiber jacket 35. A boot 45 can be further utilized to protect the optical fiber cable from bend related stress losses.

Thus, according to the exemplary embodiments described above, a specially designed load adapter can provide for practical field termination of an optical fiber in the LC-type, optical fiber connector. In addition, the design of the exemplary load adapter can reduce the possible thermal damage or distortion to a connector body housing.

An alternative method of terminating a SFF connector having thermoplastic adhesive is also provided herein. In this method, an internal assembly portion of the SFF connector, here an LC-type connector portion having a ferrule, collar/barrel, spring, and end cap are placed in an oven and heated. After insertion of the fiber, and removal of the connector portion from the oven, an LC-type connector housing can be attached to the connector portion.

Figure 4A:
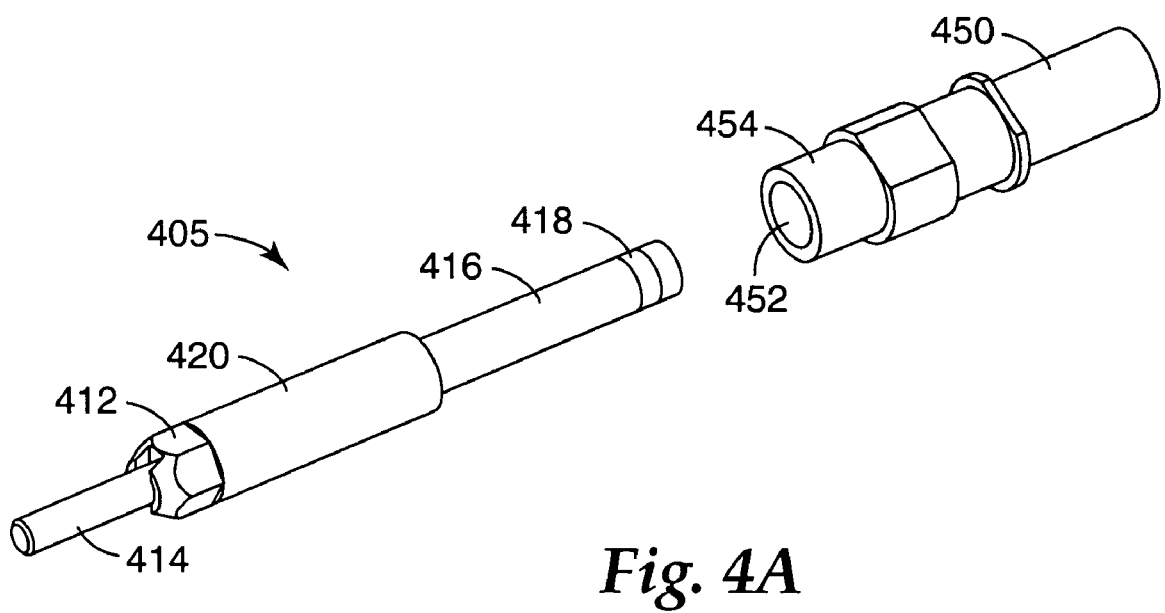
FIGS. 4A and 4B show schematic views of a small form factor internal assembly that can be terminated to an optical fiber according to an alternative embodiment of the present invention.
Figure 4B:
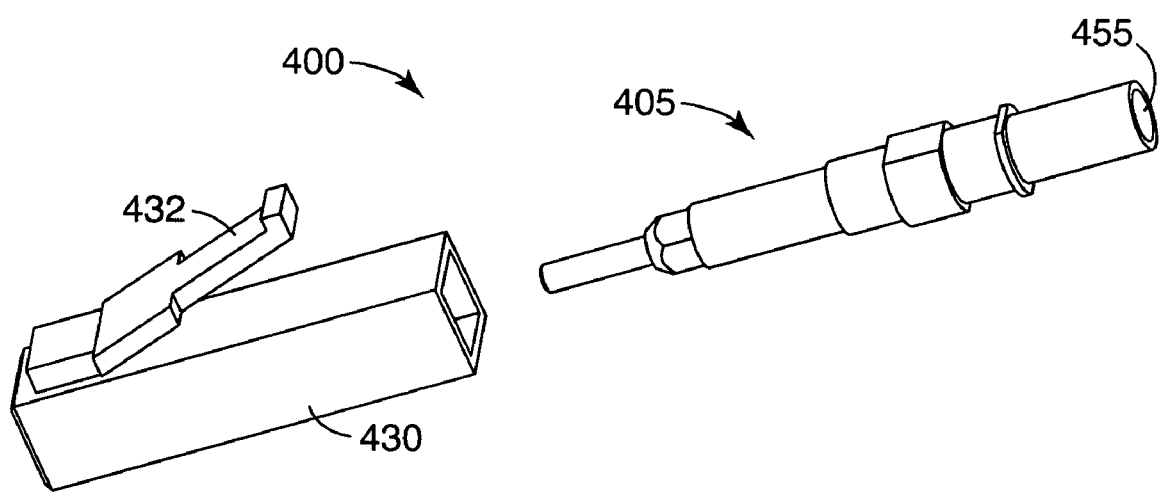

To facilitate this alternative process, a SFF, e.g., LC-type, connector can be designed as shown in FIGS. 4A and 4B. In an exemplary embodiment, LC-Type connector 400 can include two main parts, internal assembly 405 and connector housing 430.

Internal assembly 405 can include a ferrule 414, a collar 412, a barrel 416, and a spring 420. In addition, barrel 416 can include a raised collar 418 (here, shown at an end of the barrel 416 opposite ferrule 414). A retaining housing 450, mateable with collar 418 is also provided to retain the components of the internal assembly 405. Retaining housing 450 can mate with collar 418 through e.g., a snap fit. For example, raised collar 418 preferably has a slightly larger outer diameter than an inner diameter of the mating end 452 of retaining housing 450. In addition, the mating portion 452 of retaining housing 450 can be provided with one or more slits 454 to allow for the expansion of the internal assembly during the assembly of collar 418 to retaining housing 450. Retaining housing 450 also includes an opening 455 that allows for the insertion of an optical fiber during the termination process. Connector housing 430 can be constructed in a manner similar to that described above for housing 30.

In this exemplary embodiment, the internal assembly is heated, e.g., by utilizing a suitable heat source or oven, to the appropriate temperature to soften/melt the pre-loaded thermoplastic adhesive contained in the ferrule portion of the internal assembly. The optical fiber to be terminated is inserted through the end cap opening 455 until it reaches a predetermined location (e.g., the fiber tip extends just beyond the end of the ferrule). The internal assembly is removed from the heat source and is allowed to cool (for a duration of e.g., 1–2 minutes). The connector housing 430 can then be attached to the internal assembly through, e.g., a snap fit. Then, the inserted fiber is field polished to remove excess adhesive and to provide a suitably polished fiber end face. Such polishing techniques are described in a commonly pending and co-owned U.S. patent application entitled "Fiber Polishing Apparatus and Method For Field Terminable Optical Connectors," incorporated by reference herein in its entirety, and commonly-owned and co-pending U.S. patent application Ser. No. 10/811,437, incorporated above.

Thus, the above alternative embodiment can provide for field termination of a SFF connector with an even lower risk of damage/distortion to a plastic connector housing. In addition, the alternative embodiment can provide for higher melting point temperature thermoplastic adhesives to be utilized.

Figure 5A:
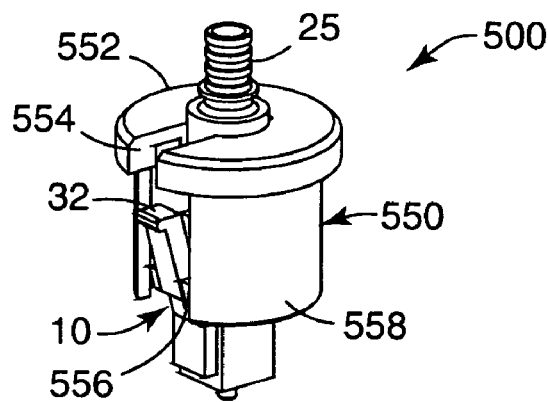
FIGS. 5A and 5B show schematic views of a load adapter according to another exemplary embodiment of the present invention.
Figure 5A:
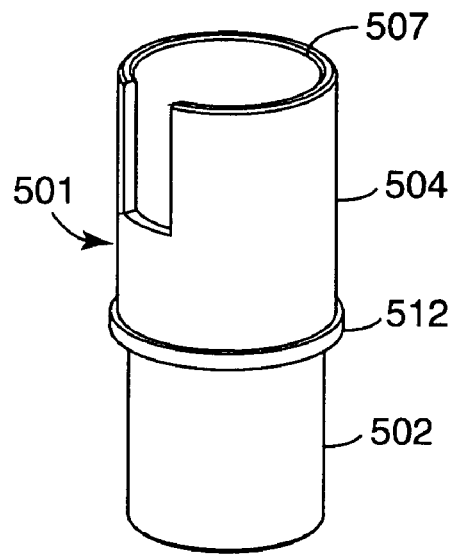
Figure 5B:
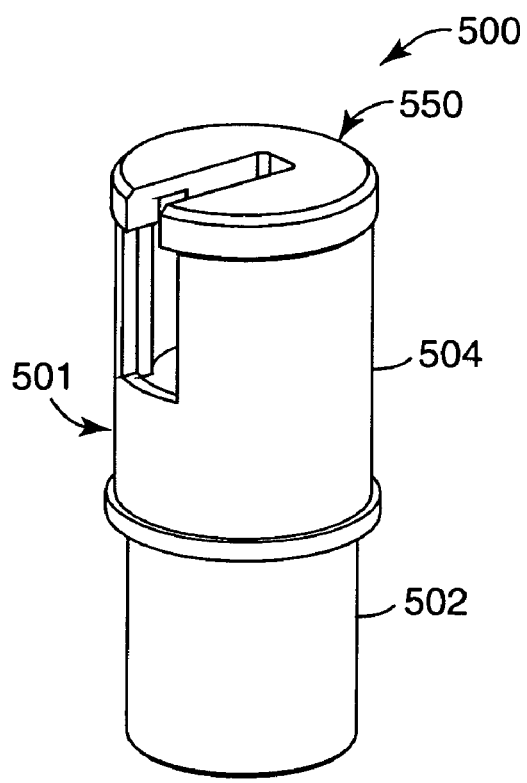

In a further alternative embodiment, direct heating of an additional portion of the SFF connector can also be employed. For example, as shown in FIGS. 5A and 5B, a load adapter 500 can include a main body 501 having a base section 502, which can be placed in a suitable oven or heating source, and a connector mounting section 504. These sections can be constructed in a manner similar to that of sections 102 and 104 described above. In addition, load adapter 500 can further include a load adapter cap 550, which can be substantially cylindrical in shape and can be constructed from a material having suitable thermal conductivity, such as a metal (e.g., brass, aluminum, etc.), that permits the rapid transmission of heat from an oven or other heating source.

FIG. 5A shows a SFF connector 10 mounted in load adapter cap 550 and FIG. 5B shows the main load adapter 500 components without a connector mounted therein. Cap 550 can be utilized to retain a SFF connector, for example, by a sliding fit, where cap section 552 includes a cap slot 554 to slidably receive an insert or connector body 25 of connector 10. Preferably, insert or connector body 25 can include one or more indents or other structural features to facilitate the sliding fit in slot 554. Further, cap 550 can be utilized to provide heating of the rear portion of the SFF connector 10, e.g., by providing a direct contact to insert or connector body 25. Also, cap 550 can include a further slot 556 to permit the protrusion of the connector latch 32 of connector housing 30 from load adapter cap 550, so that the likelihood of direct contact of the load adapter 500 to the SFF connector 10 can be reduced.

In this exemplary embodiment, cap 550 includes a substantially cylindrical surface 558 that has an outer diameter that permits sliding into opening 507 of connector mounting section 504. The inner diameter of connector mounting section 504 is designed to provide substantial contact to the outer surface 558 of cap 550 so that heat can be more efficiently transferred to the connector body 25. The load adapter 500 can further include one or more protrusions or rings 512, which can be utilized to allow the holding of load adapter 500 by a tool (not shown) for placement into and/or removal from the oven or heat source. In addition, in this exemplary alternative embodiment, the utilization of a stem or stem boss, such as shown in FIGS. 1A–1C, is optional, as contact heating of the connector 10 is provided by cap 550.

Thus, according to this alternative embodiment, rapid and direct heating of the more thermally conductive portions of the SFF connector can be employed. This method and apparatus can aid installers of fiber optic networks, such as Local Area Networks (LANs) or Premise buildings, for the field termination of small form factor connectors, such as the exemplary LC connectors described above.

EXAMPLES AND TESTS

In an experiment, a thermocouple was inserted into the barrel portion of an LC connector (available from OFS, Georgia, USA), having a construction similar to that shown in FIG. 3 and having an outer housing made of a plastic having a heat distortion temperature of greater than about 235° C. The thermocouple was positioned in a space to be occupied by the thermoplastic adhesive in the adhesive loaded connector. The LC connector was placed into the connector mounting section of the load adapter, constructed similar to load adapter 100 shown in FIG. 1, by slidably inserting the ferrule portion of the LC-type connector in a stem portion of the connector mounting section. The load adapter with the LC connector and thermocouple was then inserted into an oven port of a portable heat oven. The oven applied heat to the load adapter and the temperature inside of the barrel portion was monitored as a function of time. Different load adapter designs were tested as a comparison, one design similar to that shown in FIG. 1, having two slots, and another design having a single slot.

It has been determined by the investigators that the temperature within the barrel of the LC connector can reach about 200° C. to about 205° C. in order to facilitate straightforward mounting of the fiber in the LC connector having a thermoplastic adhesive. Also, it has been determined by the investigators that the maximum temperature that the LC connector is exposed to can be kept at a temperature that is sufficiently below the heat distortion temperature of the plastic used to fabricate the outer housing of the connector.

Table 1 below shows the temperatures that are reached in the barrel of a LC connector in this experiment:

TABLE 1

| Load Adapter Style | 30 s | 60 s | 90 s | Max. Temp. | Comment |
|---|---|---|---|---|---|
| Single Slot | 138 ± 6 | 198 ± 2 | 217 ± 1 | 226 ± 2 | Housing dimensions changed |
| Double Slot | 134 ± 3 | 192 ± 5 | 211 ± 3 | 221 ± 2 | No change in housing dimensions |

The above experiment shows that suitable fiber insertion can take place after about 60 seconds to 90 seconds for each of the load adapter designs. However, for the single slot structure, some deformation of the connector housing can occur when the connector is left in the load adapter for an extended period to reach a maximum temperature of about 226° C. The samples heated within the double slot structure load adapter did not experience deformation of the connector housing.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A load adapter for terminating an optical fiber in a small form factor connector having a ferrule portion and a barrel portion that include a pre-loaded thermoplastic adhesive material, and a housing, comprising:
 a thermally conductive body having a base section and a connector mounting section extending axially therefrom;
 wherein the base section is adapted to be mountable in an oven port of a portable heat source; and
 wherein the connector mounting section has a substantially cylindrical shape adapted to surround a substantial portion of the small form factor connector housing and including at least one slot, wherein the connector mounting section includes a mount adapted to receive the small form factor connector, the mount including a stem having a substantially cylindrical structure adapted to slidably receive the ferrule portion of the small form factor connector, and wherein an end of a received ferrule portion of the small form factor connector extends beyond an edge of an inner wall of the stem.

2. The load adapter according to claim 1, wherein the small form factor connector is an LC-type connector, wherein the mount further includes a stem boss that provides base for the stem, the stem boss being substantially cylindrical and having an interior cavity, wherein the end of the received ferrule portion of the small form factor connector extends into the interior cavity.

3. The load adapter according to claim 2, wherein a first air gap is disposed between the stem boss and an end of the connector housing, and a second air gap is disposed between an inner wall of the connector mounting section and an outer surface of the housing of the received connector.

4. The load adapter according to claim 1, wherein the base section is substantially cylindrical, and wherein a height of the base section is greater than a depth of the oven port of the portable oven.

5. The load adapter according to claim 1, wherein the thermally conductive body comprises at least one of nickel-plated brass, aluminum and steel.

6. A load adapter, for terminating an optical fiber in a small form factor connector having a housing and an internal assembly, the internal assembly including a ferrule portion, a raised collar, and a barrel that includes a thermoplastic adhesive material, a spring, and a connector body portion that retains the ferrule portion, raised collar, barrel, and spring, comprising:
 a thermally conductive body having a base section and a connector mounting section extending axially therefrom, wherein the base section is adapted to be mountable in an oven port of a portable heat source, and wherein the connector mounting section has a substantially cylindrical shape adapted to surround a substantial portion of the small form factor connector housing and including at least one slot; and
 a thermally conductive cap having a substantially cylindrical body adapted to be slidably received in an opening of the connector mounting section, wherein the cap includes a cap slot to slidably receive the connector body portion of the small form factor connector.

7. The load adapter of claim 6, wherein the connector mounting section includes a mount adapted to receive the ferrule portion of the small form factor connector, the mount including a stem having a substantially cylindrical structure adapted to slidably receive the ferrule portion of the small form factor connector, and wherein an end of a received ferrule portion of the small form factor connector extends beyond an edge of an inner wall of the stem.

* * * * *